(12) United States Patent
Liang et al.

(10) Patent No.: US 8,319,755 B2
(45) Date of Patent: Nov. 27, 2012

(54) STYLUS

(75) Inventors: Shi-Xu Liang, Shenzhen (CN);
Chung-Yeh Sa, Santa Clara, CA (US)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 250 days.

(21) Appl. No.: 12/848,330

(22) Filed: Aug. 2, 2010

(65) Prior Publication Data
US 2011/0261022 A1    Oct. 27, 2011

(30) Foreign Application Priority Data
Apr. 23, 2010    (CN) .......................... 2010 1 1543752

(51) Int. Cl.
*G06F 3/041*    (2006.01)

(52) U.S. Cl. ....................................... 345/179; 345/173

(58) Field of Classification Search .................. 401/55, 401/99, 100, 104–107, 196, 197, 202, 208, 401/209, 213, 192, 195, 243; 708/107; 345/179, 345/173, 174, 175, 176; 700/94; 178/19.01, 178/19.03, 19.04, 19.02

See application file for complete search history.

(56) References Cited

U.S. PATENT DOCUMENTS

| | | | | |
|---|---|---|---|---|
| 7,195,415 | B1* | 3/2007 | Vial | 401/216 |
| RE40,272 | E * | 4/2008 | Chan | 401/131 |
| 8,147,159 | B2* | 4/2012 | Glesser et al. | 401/195 |
| 2005/0057535 | A1* | 3/2005 | Liu et al. | 345/179 |
| 2010/0302213 | A1* | 12/2010 | Yeh | 345/179 |

\* cited by examiner

*Primary Examiner* — Kent Chang
*Assistant Examiner* — Nelson Rosario
(74) *Attorney, Agent, or Firm* — Altis Law Group, Inc.

(57) ABSTRACT

An exemplary stylus includes a housing, a stylus body, a latching element and an elastic element. The housing has a receptacle defined therethrough. The stylus body is rotatably assembled to the receptacle. The latching element is slidably accommodated in the receptacle, the latching element is configured for interacting with the stylus body so that the stylus body rotates relative to the housing about an axis and the latching element moves linearly along another axis. The elastic element is resisted between the housing and the latching element, the elastic element is used for accumulating an elastic force with rotation of the stylus body relative to the housing and the movement of the latching element.

13 Claims, 5 Drawing Sheets

STYLUS

CROSS-REFERENCE TO RELATED APPLICATIONS

This application is related to co-pending U.S. patent application Ser. Nos. 12/848,334, 12/848,337, and 12/848,343, all entitled "STYLUS", and all invented by Liang et al. All these related applications have the same assignee as the present application and have been concurrently filed herewith. The above-identified applications are incorporated herein by reference.

BACKGROUND

1. Technical Field

This exemplary disclosure generally relates to styluses.

2. Description of Related Art

It is well-known that a variety of devices include a touch screen. Examples of such devices include smart phones, personal digital assistants (PDAs), pagers, personal organizers, and the like. These devices typically include a display module under the touch screen. The display module generates target images associated with menu options, programs, user choices, and other operations. The user controls the device by pressing the touch screen over the target image with a stylus. However, stylus bodies of typical styluses are stiff or rigid, and may not be convenient to use.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of handheld or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability, and the like. Accordingly, any reference herein to the mobile telephone should also be considered to apply equally to other portable wireless electronic devices.

Figure 1:
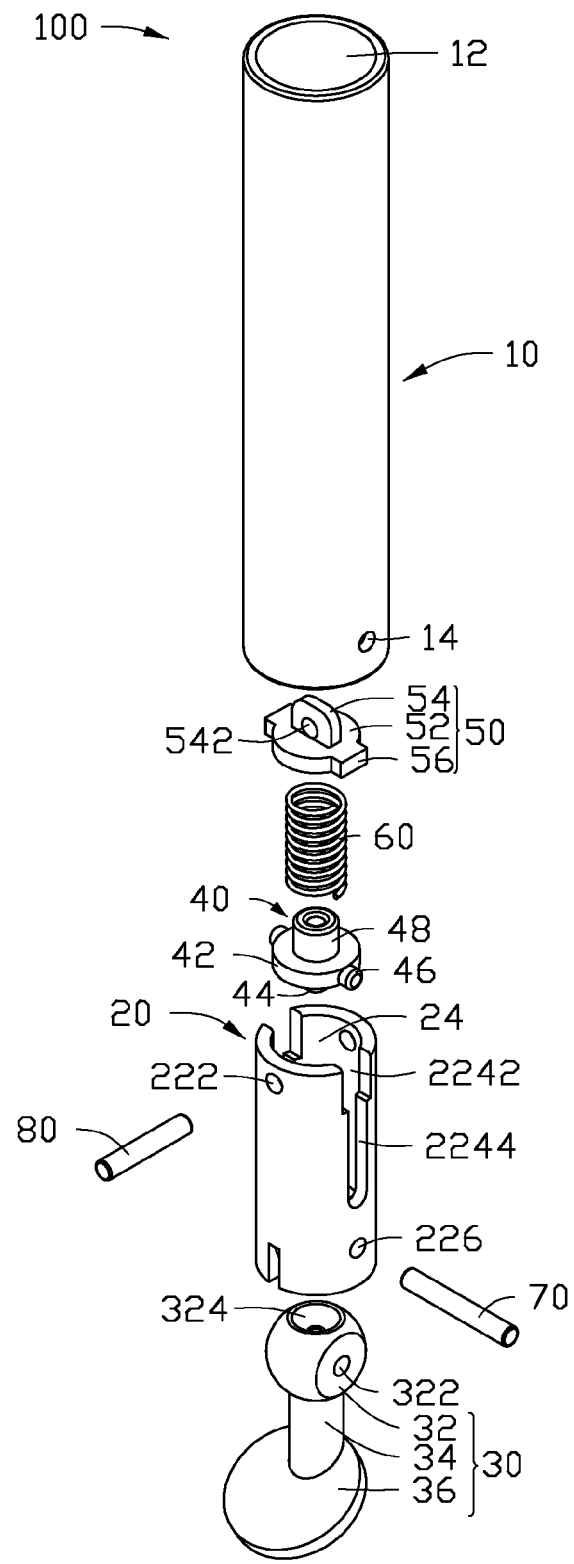
FIG. 1 is an exploded view of an exemplary stylus.
Figure 3:
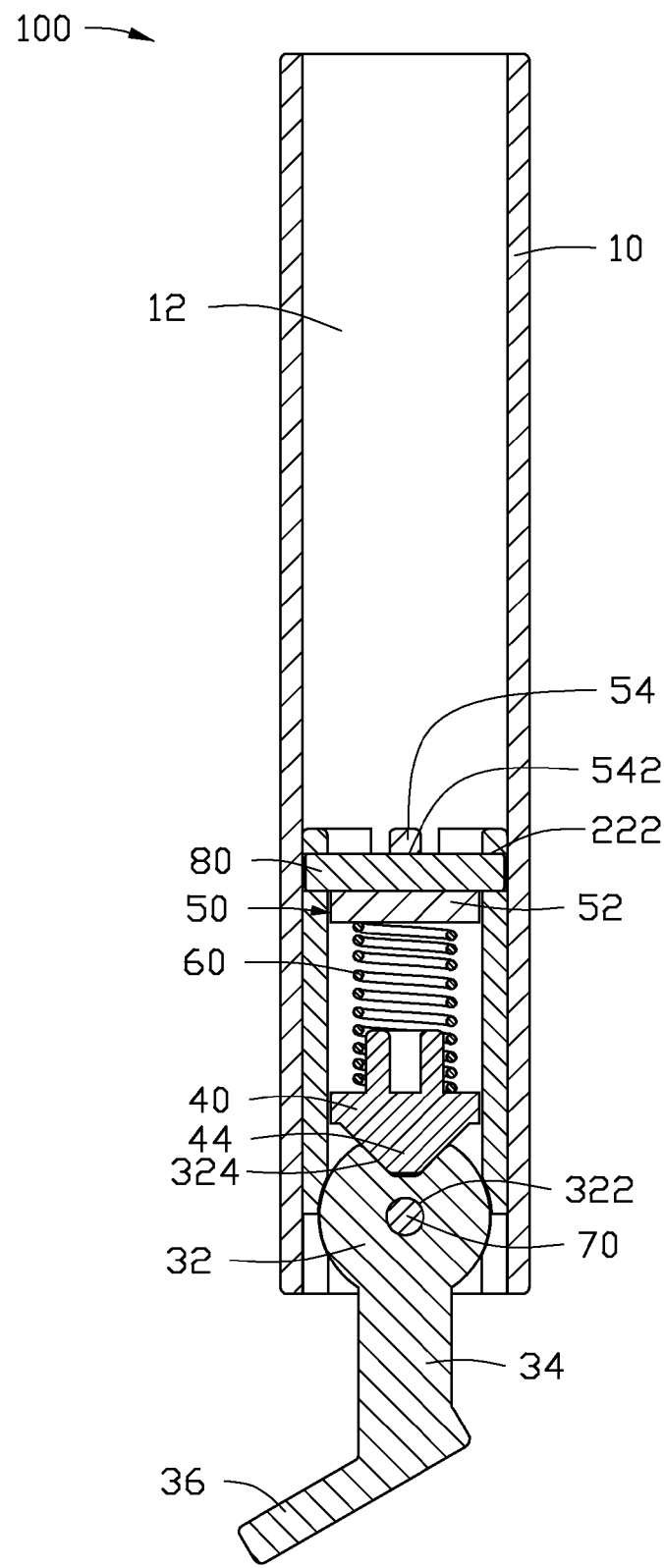
FIG. 3 is a cross-sectional view of the stylus shown in FIG. 2 along the line III-III, and wherein the stylus is in a retracted state.

Referring to FIGS. 1 and 3, the stylus 100 includes a housing 10, a shell 20 mounted in the housing 10, a stylus body 30 rotatably mounted to one end of the shell 20, a latching element 40 elastically latching with the stylus body 30, a resisting element 50 mounted to another end of the shell 20, and an elastic element 60 located between the latching element 40 and the resisting element 50. The stylus body 30 is rotatably mounted to the shell 20 by a pin 70, and two ends of the pin 70 are retained to the housing 10 to mount the shell 20 to the housing 10. The resisting element 50 is mounted to the shell 20 by a post 80.

The housing 10 is hollow, and longitudinally defines a receptacle 12 therethrough. The housing 10 further includes two aligned retaining holes 14 defined at one end thereof. The retaining holes 14 are for retaining the pin 70 to the housing 10.

The shell 20 is tubular and has generally the same shape as, but is slightly smaller than, the receptacle 12 of the housing 10—so that the shell 20 can be accommodated in the receptacle 12. The shell 20 includes a compartment 24 longitudinally defined therethrough for accommodating the latching element 40 and the elastic element 60. One end of the shell 20 transversely defines two aligned troughs 222 for retaining the post 80 therein, two aligned positioning slots 2242 for positioning the resisting element 50 therein, and two aligned guiding grooves 2244 for guiding the latching element 40 to slide relative to the shell 20. Another end of the shell 20 transversely defines two apertures 226 for retaining the pin 70 therein. When the shell 20 is located in the housing 10, the apertures 226 are aligned with the retaining holes 14.

The stylus body 30 includes a joint 32, a link 34 protruding from the joint 32, and a tip 36 positioned at a distal end of the link 34. The joint 32 is substantially spherical; and defines an orifice 322 for engagingly receiving the pin 70, and a latching recess 324 for latchingly receiving the latching element 40. The tip 36 is for touching a touch panel of an electronic device (not shown).

The latching element 40 includes a resisting board 42 resisting the elastic element 60, a latching portion 44 protruding from one end of the resisting board 42 for latching in the latching recess 324, two sliding blocks 46 oppositely protruding from a periphery of the resisting board 42, and a retaining portion 48 protruding from another end of the resisting board 42. The latching portion 44 is sized and shaped to latch with the latching recess 324, so that the stylus body 30 is held in a retracted state like that shown in FIG. 3. The latching portion 44 can slide out of the latching recess 324 so that the stylus body 30 can stand in a tilted state like that shown in FIG. 4. Each sliding block 46 is slidably accommodated in one of the guiding grooves 2244, so that the latching element 40 can slide relative to the shell 20. The retaining portion 48 is received in a bottom end of the elastic element 60, for holding the elastic element 60 in position.

The resisting element 50 includes a plate 52 for resisting the elastic element 60, a protrusion 54 protruding from one surface of the plate 52, and two positioning blocks 56 oppositely protruding from a peripheral wall of the plate 52. The protrusion 54 defines a securing hole 542 for securing the resisting element 50 to the shell 20. When the resisting element 50 is accommodated in the shell 20, the securing hole 542 is aligned with the troughs 222, and the post 80 is tightly fitted in the securing hole 542 and the troughs 222 so that the resisting element 50 is firmly mounted to the shell 20. Each positioning block 56 is located in one of the positioning slots 2242 so that the resisting element 50 can precisely mounted to the shell 20.

The elastic element 60 is located between the latching element 40 and the resisting element 50. The elastic element 60 exerts a force on the latching element 40, causing the latching element 40 to slide relative to the shell 20 so that the latching element 40 slides toward the stylus body 30. Thereby, the latching portion 44 latches in latching recess 324 and resists against the joint 32 of the stylus body 30. The elastic element 60 may be an expansion spring, a compression spring, or an elastic band. One elastic element 60 is shown in this embodiment. However, it is understood that a plurality of elastic elements 60 may instead be used.

Figure 2:
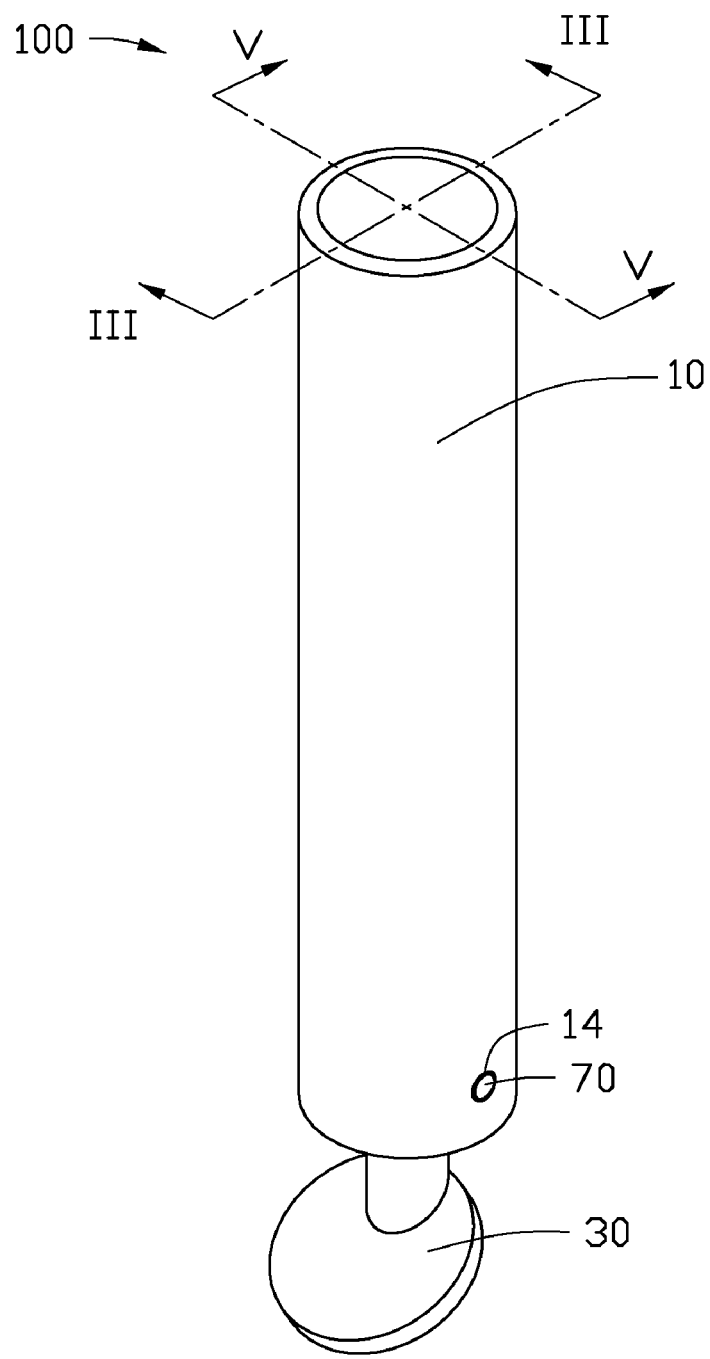
FIG. 2 is an assembled view of the stylus shown in FIG. 1.

Referring to FIG. 1-3, in assembly, the latching element 40 is received in the shell 20 and each sliding block 46 is located in one of the guiding grooves 2244. The bottom end of the elastic element 60 is retained around the retaining portion 48 of the latching element 40 and resists the resisting board 42. The resisting element 50 is received in the shell 20 and the securing hole 542 is aligned with the troughs 222. The post 80 is inserted into the troughs 222 and the securing hole 542 to hold the resisting element 50 in the shell 20, and the plate 52 resists a top end of the elastic element 60. The shell 20 is inserted in the receptacle 12, and the apertures 226 are aligned with the retaining holes 14. The joint 32 is inserted in the compartment 24, the orifice 322 is aligned with the apertures 226, and the latching recess 324 latchingly receives the latching portion 44. The pin 70 is inserted in the retaining holes 14, the apertures 226 and the orifice 322, to assemble the housing 10, the shell 20 and the stylus body 30 together.

Figure 4:
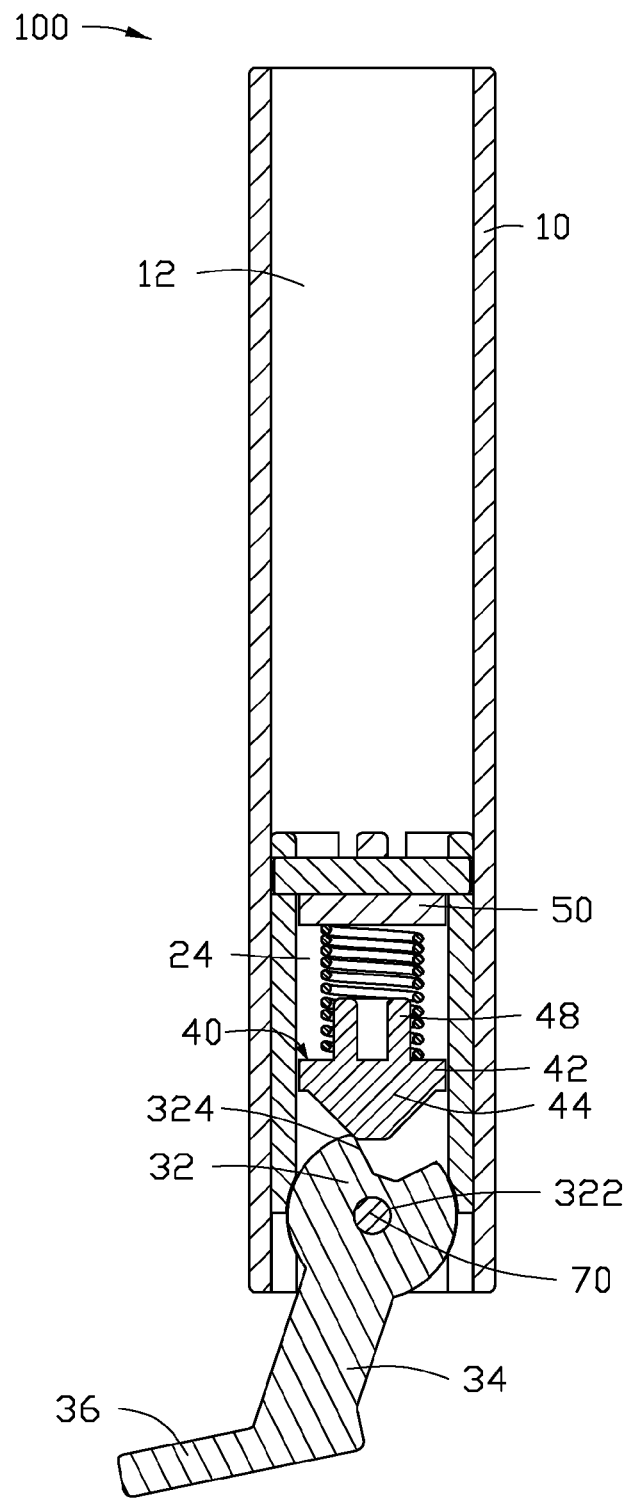
FIG. 4 is similar to FIG. 3, but wherein the stylus is in a tilted state.
Figure 5:
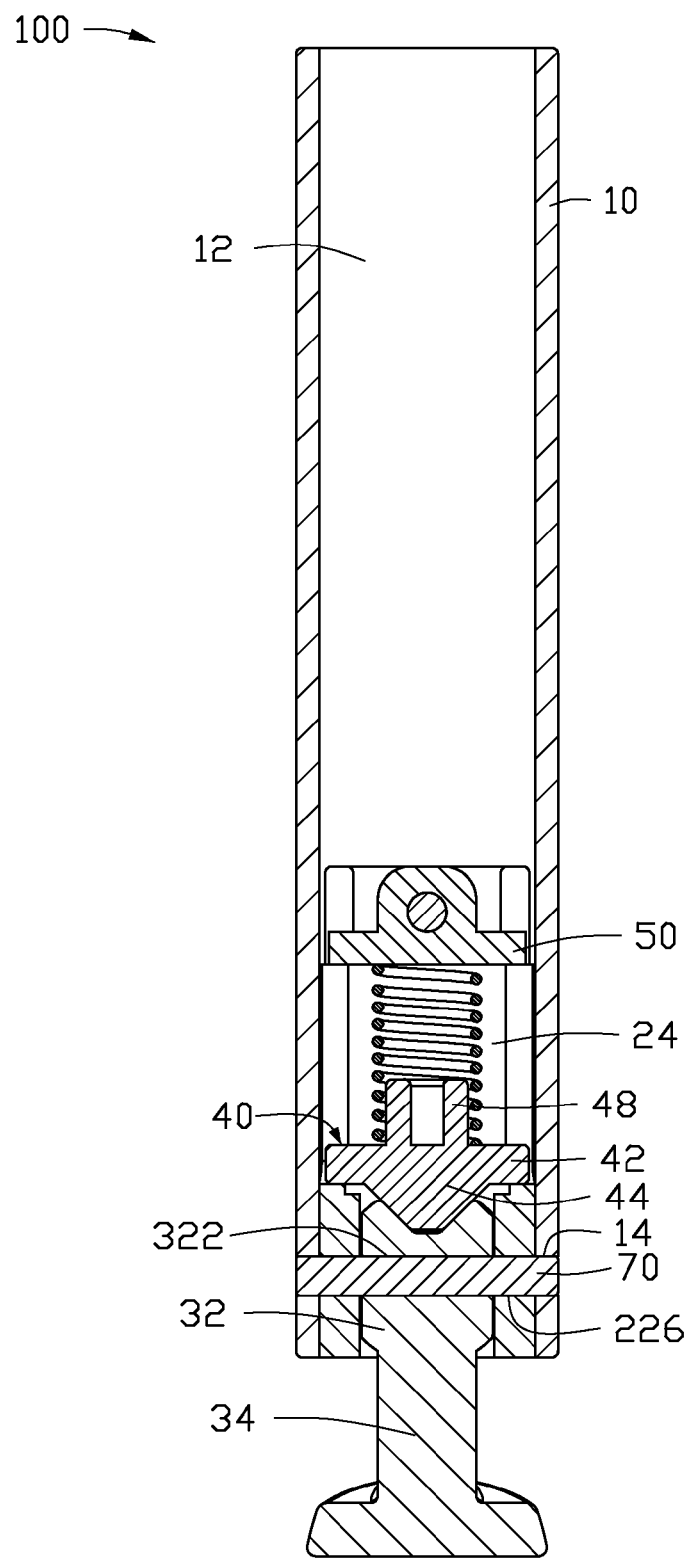
FIG. 5 is a cross-sectional view of the stylus shown in FIG. 2 along the line V-V.

Referring to FIGS. 3-5, in operation, the stylus body 30 can rotate about the pin 70 relative to the shell 20 and the housing 10 so that the stylus body 30 is tilted for convenience of use. In this motion, the latching portion 44 slides out of the latching recess 324, and the sliding blocks 46 slide in the corresponding guiding grooves 2244 so that the latching element 40 slides away from the stylus body 30. Thus, the elastic element 60 is compressed to accumulate elastic potential energy for providing force to drive the latching element 40 to slide back toward the stylus body 30 until the latching portion 44 latches in the latching recess 324 once more. Thus, the stylus body 30 is located in the retracted state shown in FIG. 3 again.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary embodiments to the full extent indicated by the broad general meaning of the terms in which the appended claims are expressed.

What is claimed is:

1. A stylus, comprising:
a housing having a receptacle defined therethrough;
a shell received in the receptacle;
a stylus body received in the shell and rotatably connected to one end of the shell and the housing;
a latching element slidably accommodated in the shell, the latching element configured for interacting with the stylus body so that the stylus body rotates relative to the housing about an axis and the latching element moves linearly along another axis;
a resisting element received in the receptacle and mounted at another end of the shell; and
an elastic element resisted between the resisting element and the latching element, the elastic element capable of accumulating elastic potential energy with rotation of the stylus body relative to the housing and the movement of the latching element.

2. The stylus as claimed in claim 1, wherein the stylus body defines a latching recess therein; the latching element includes a latching portion protruding therefrom, and the latching portion latches in the latching recess when the stylus is in a retracted state, the latching portion slides out of the latching recess of the stylus body when the stylus body is in a tilted state.

3. The stylus as claimed in claim 2, wherein said one end of the housing transversely defines two retaining holes therethrough; said one end of the shell defines two aligned apertures, the stylus body defines an orifice therethrough that is aligned with the retaining holes and the apertures; the stylus further includes a pin, and the pin is tightly fitted in the retaining holes, the apertures and the orifice to mount the stylus body to the housing.

4. The stylus as claimed in claim 3, wherein the shell longitudinally defines a compartment therethrough, the resisting element is mounted in the compartment, and the latching element is slidably accommodated in the compartment.

5. The stylus as claimed in claim 4, wherein the shell transversely defines two aligned guiding grooves; the latching element has a resisting board and two sliding blocks protruding therefrom; and each sliding block is slidably accommodated in one of the guiding grooves to guide the latching element to slide relative to the housing, and the resisting board resists the elastic element.

6. The stylus as claimed in claim 1, wherein the shell transversely defines two aligned troughs, the resisting element defines a securing hole aligned with the troughs, and a post is tightly fitted in the troughs and the securing holes to mount the resisting element to the shell.

7. The stylus as claimed in claim 6, wherein the shell further defines two positioning slots therethrough, the resisting element further includes a plate, a protrusion protruding from one surface of the plate and two positioning blocks protruding from a peripheral wall of the plate; and each positioning block is received in one of the positioning slots to mount the resisting element to the shell.

8. The stylus as claimed in claim 1, wherein the stylus body includes a joint, the joint is substantially spherical, and the latching recess is defined in the joint.

9. A stylus, comprising:
a housing having a receptacle defined therethrough;
a shell mounted in the receptacle, the shell defining a compartment therethrough;
a stylus body accommodated in the compartment and rotatably connected to the housing and the shell, the stylus body defining a latching recess;
a latching element slidably accommodated in the compartment, the latching element including a latching portion protruding therefrom engaging in the latching recess; and
an elastic element providing an elastic force to drive the latching element to slide toward the stylus body so that the latching portion resists against the stylus body to hold the stylus body in a retracted position;
wherein when the stylus body tilts relative to the housing, the latching element slides out of the latching recess of the stylus body for allowing the stylus body to stand in a tiled state, and the elastic element is compressed to accumulate elastic potential energy for providing force to drive the latching element to slide back toward the stylus body.

10. The stylus as claimed in claim 9, wherein the latching element includes a resisting board and two sliding blocks oppositely protruding from a periphery of the resisting board, the latching portion protrudes from one end of the resisting board, and the resisting board resists the elastic element, the shell defines two guiding grooves, each sliding block is slidably accommodated in one of the guiding grooves.

11. The stylus as claimed in claim 10, wherein a retaining portion protrudes from another end of the resisting board, the retaining portion is received in a bottom end of the elastic element.

12. The stylus as claimed in claim 10, further comprising a resisting element, wherein the resisting element is received in the compartment, and includes a plate, a protrusion protruding from one surface of the plate, and two positioning blocks oppositely protruding from a peripheral wall of the plate, the shell defines two positioning slots, each positioning block is located in one of the positioning slots.

13. The stylus as claimed in claim 12, wherein the shell defines two troughs, the protrusion defines a securing hole, the securing hole is aligned with the troughs, and a post is fitted in the securing hole and the troughs.

* * * * *

UNITED STATES PATENT AND TRADEMARK OFFICE
CERTIFICATE OF CORRECTION

PATENT NO. : 8,319,755 B2  
APPLICATION NO. : 12/848330  
DATED : November 27, 2012  
INVENTOR(S) : Shi-Xu Liang and Chung Yeh Sa Page 1 of 1

It is certified that error appears in the above-identified patent and that said Letters Patent is hereby corrected as shown below:

Title Page, Item (30) should read

-- (30)    Foreign Application Priority Data

Apr. 23, 2010   (CN) ...........................201010154372.1 --

Signed and Sealed this
Twenty-ninth Day of October, 2013

Teresa Stanek Rea
*Deputy Director of the United States Patent and Trademark Office*